(12) United States Patent
Saptharishi et al.

(10) Patent No.: US 12,431,025 B2
(45) Date of Patent: Sep. 30, 2025

(54) CONTEXTUAL TRANSCRIPTION AUGMENTATION METHODS AND SYSTEMS

(71) Applicant: HONEYWELL INTERNATIONAL INC., Charlotte, NC (US)

(72) Inventors: Hariharan Saptharishi, Madurai (IN); Gobinathan Baladhandapani, Madurai (IN); Raghupathy P, Bangalore (IN); Sivakumar Kanagarajan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 370 days.

(21) Appl. No.: 17/412,012

(22) Filed: Aug. 25, 2021

(65) Prior Publication Data

US 2022/0406194 A1 Dec. 22, 2022

(30) Foreign Application Priority Data

Jun. 16, 2021 (IN) .............................. 202111026764

(51) Int. Cl.
*G08G 5/26* (2025.01)
*G08G 5/21* (2025.01)
(Continued)

(52) U.S. Cl.
CPC .................. *G08G 5/26* (2025.01); *G08G 5/21* (2025.01); *G10L 15/26* (2013.01); *G10L 25/48* (2013.01)

(58) Field of Classification Search
CPC .... G08G 5/0013; G08G 5/0021; G08G 5/065; G10L 15/26; G10L 25/48
See application file for complete search history.

(56) References Cited

U.S. PATENT DOCUMENTS 6,992,626 B2 1/2006 Smith
7,184,863 B2 2/2007 Weineck
(Continued)

FOREIGN PATENT DOCUMENTS

CN 110335609 A 10/2019
CN 111785257 A 10/2020
(Continued)

OTHER PUBLICATIONS

H. Helmke et al., "Ontology for Transcription of ATC Speech Commands of SESAR 2020 Solution PJ. 16-04," 2018 IEEE/AIAA 37th Digital Avionics Systems Conference (DASC), London, UK, 2018, pp. 1-10 (Year: 2018).*
(Continued)

*Primary Examiner* — Daniel C Washburn
*Assistant Examiner* — Penny L Caudle
(74) *Attorney, Agent, or Firm* — Ingrassia Fisher & Lorenz LLP

(57) ABSTRACT

Methods and systems are provided for assisting operation of a vehicle using speech recognition and transcription. One method involves identifying an operational objective for an audio communication with respect to the vehicle, determining an expected clearance communication for the vehicle based at least in part on the operational objective, identifying a discrepancy between a transcription of the audio communication and the expected clearance communication, augmenting the transcription of the audio communication using a current operational context to reduce the discrepancy, and providing a graphical indication influenced by the augmented transcription.

18 Claims, 7 Drawing Sheets

(51) Int. Cl.
*G10L 15/26* (2006.01)
*G10L 25/48* (2013.01)

(56) References Cited

U.S. PATENT DOCUMENTS

| | | |
|---|---|---|
| 7,415,326 B2 | 8/2008 | Komer et al. |
| 7,580,377 B2 | 8/2009 | Judd |
| 7,668,719 B2 | 2/2010 | Nakagawa et al. |
| 7,733,903 B2 | 6/2010 | Bhogal et al. |
| 7,809,405 B1 | 10/2010 | Rand et al. |
| 7,881,832 B2 | 2/2011 | Komer et al. |
| 8,149,141 B2 | 4/2012 | Coulmeau et al. |
| 8,180,503 B2 | 5/2012 | Estabrook et al. |
| 8,280,741 B2 | 10/2012 | Colin et al. |
| 8,340,839 B2 | 12/2012 | Yogesha et al. |
| 8,681,040 B1 | 3/2014 | Rathinam et al. |
| 8,704,701 B2 | 4/2014 | Pschierer et al. |
| 8,768,698 B2 | 7/2014 | Mengibar et al. |
| 8,793,139 B1 | 7/2014 | Serban et al. |
| 8,812,316 B1 | 8/2014 | Chen |
| 8,909,392 B1 | 12/2014 | Carrico |
| 8,957,790 B2 | 2/2015 | Cornell et al. |
| 9,047,870 B2 | 6/2015 | Ballinger et al. |
| 9,190,073 B2 | 11/2015 | Dong et al. |
| 9,443,433 B1 | 9/2016 | Conway et al. |
| 9,487,167 B2 | 11/2016 | Graumann et al. |
| 9,620,119 B2 | 4/2017 | Bilek et al. |
| 9,642,184 B2 | 5/2017 | Plocher et al. |
| 9,665,645 B2 | 5/2017 | Hawley |
| 9,666,178 B2 | 5/2017 | Loubiere et al. |
| 9,704,405 B2 | 7/2017 | Kashi et al. |
| 9,830,829 B1 | 11/2017 | Doyen et al. |
| 9,881,608 B2 | 1/2018 | Lebeau et al. |
| 10,056,085 B2 | 8/2018 | Klose et al. |
| 10,204,430 B2 | 2/2019 | Gowda |
| 10,490,085 B2 | 11/2019 | Cotdeloup et al. |
| 10,535,351 B2 | 1/2020 | Gaston et al. |
| 10,818,192 B2 | 10/2020 | Chen et al. |
| 2004/0124998 A1 | 7/2004 | Dame |
| 2004/0263381 A1 | 12/2004 | Mitchell et al. |
| 2005/0144187 A1 | 6/2005 | Che et al. |
| 2005/0203700 A1 | 9/2005 | Merritt |
| 2006/0229873 A1 | 10/2006 | Eide et al. |
| 2007/0189328 A1 | 8/2007 | Judd |
| 2007/0288128 A1 | 12/2007 | Komer et al. |
| 2008/0201148 A1 | 8/2008 | Desrochers |
| 2011/0028147 A1 | 2/2011 | Calderhead, Jr. et al. |
| 2011/0125503 A1 | 5/2011 | Dong et al. |
| 2011/0137653 A1 | 6/2011 | Ljolje et al. |
| 2011/0202351 A1 | 8/2011 | Plocher et al. |
| 2011/0231036 A1 | 9/2011 | Yogesha et al. |
| 2012/0078448 A1 | 3/2012 | Dorneich et al. |
| 2012/0239761 A1 | 9/2012 | Linner et al. |
| 2013/0093612 A1 | 4/2013 | Pschierer et al. |
| 2013/0103297 A1 | 4/2013 | Bilek et al. |
| 2014/0300495 A1 | 10/2014 | Scheu et al. |
| 2015/0081138 A1 | 3/2015 | Lacko et al. |
| 2015/0162001 A1 | 6/2015 | Kar et al. |
| 2015/0212671 A1 | 7/2015 | Judy et al. |
| 2015/0212701 A1 | 7/2015 | Rodney et al. |
| 2016/0036751 A1 | 2/2016 | Ban |
| 2016/0063999 A1 | 3/2016 | Gaston et al. |
| 2016/0125744 A1 | 5/2016 | Shamasundar et al. |
| 2016/0155435 A1 | 6/2016 | Mohideen |
| 2016/0360336 A1 | 12/2016 | Gross et al. |
| 2016/0379640 A1 | 12/2016 | Joshi et al. |
| 2017/0039858 A1 | 2/2017 | Wang et al. |
| 2018/0061243 A1 | 3/2018 | Shloosh |
| 2019/0147858 A1 | 5/2019 | Letsu-Dake et al. |
| 2019/0244528 A1 | 8/2019 | Srinivasan et al. |
| 2020/0322040 A1 | 10/2020 | Middlestead et al. |
| 2020/0372916 A1 | 11/2020 | Delpech |
| 2021/0295840 A1 | 9/2021 | John et al. |
| 2021/0312927 A1* | 10/2021 | Baladhandapani ..... G10L 15/08 |
| 2022/0078071 A1 | 3/2022 | Agapitos et al. |
| 2022/0115008 A1* | 4/2022 | Pust .................... G08G 5/0013 |
| 2022/0309928 A1 | 9/2022 | Chopra et al. |
| 2022/0343897 A1 | 10/2022 | Agarwal et al. |

FOREIGN PATENT DOCUMENTS

| | | | |
|---|---|---|---|
| DE | 102009025530 A1 | 12/2010 | |
| EP | 0613110 A1 | 8/1994 | |
| EP | 0618565 A2 | 10/1994 | |
| EP | 1318492 A2 | 6/2003 | |
| EP | 2026328 A1 | 2/2009 | |
| EP | 2874133 A1 * | 5/2015 | ........... G08G 5/0013 |
| EP | 3664065 A1 | 6/2020 | |
| EP | 3889947 A1 | 10/2021 | |
| FR | 3009759 B1 | 2/2015 | |
| FR | 3032574 A1 * | 8/2016 | ......... G06F 17/2282 |
| FR | 3032575 A1 | 8/2016 | |
| KR | 102003321 B1 | 7/2019 | |
| WO | 2016/076939 A1 | 5/2016 | |

OTHER PUBLICATIONS

H. Helmke et al., "Machine Learning of Air Traffic Controller Command Extraction Models for Speech Recognition Applications," 2020 AIAA/IEEE 39th Digital Avionics Systems Conference (DASC), San Antonio, TX, USA, 2020, pp. 1-9 (Year: 2020).*

Shuo Chen, H. D. Kopald, A. Elessawy, Z. Levonian and R. M. Tarakan, "Speech inputs to surface safety logic systems," 2015 IEEE/AIAA 34th Digital Avionics Systems Conference (DASC), Prague, 2015, pp. 3B2-1-3B2-11 (Year: 2015).*

Machine Translation of FR 3032574A1 (Year: 2015).*

"Air-Ground Voice Communications," SKYbrary, downloaded from Internet Mar. 28, 2018.

"Loss of Communication," SKYbrary, downloaded from Internet Mar. 28, 2018.

Cardosi, Kim and Tracy Lennertz. "Loss of Controller-Pilot Voice Communications in Domestic En Route Airspace." DOT-VNTSC-FAA-17-04, dated Feb. 2016.

Baladhandapani, G. et al., "Transcription System and Related Supplementation Methods," filed Jun. 24, 2022 and assigned U.S. Appl. No. 17/808,816.

* cited by examiner

CONTEXTUAL TRANSCRIPTION AUGMENTATION METHODS AND SYSTEMS

CROSS REFERENCE TO RELATED APPLICATION

This application claims priority to Indian Provisional Patent Application No. 202111026764, filed Jun. 16, 2021, the entire content of which is incorporated by reference herein.

TECHNICAL FIELD

The subject matter described herein relates generally to vehicle systems, and more particularly, embodiments of the subject matter relate to avionics systems and methods for mitigating potential ambiguities or uncertainties in air traffic control clearance communications.

BACKGROUND

Air traffic control typically involves voice communications between air traffic control and a pilot or crewmember onboard the various aircrafts within a controlled airspace. For example, an air traffic controller (ATC) may communicate an instruction or a request for pilot action by a particular aircraft using a call sign assigned to that aircraft, with a pilot or crewmember onboard that aircraft acknowledging the request (e.g., by reading back the received information) in a separate communication that also includes the call sign. As a result, the ATC can determine that the correct aircraft has acknowledged the request, that the request was correctly understood, what the pilot intends to do, etc.

Unfortunately, there are numerous factors that can complicate clearance communications, or otherwise result in a misinterpretation of a clearance communication, such as, for example, the volume of traffic in the airspace, similarities between call signs of different aircrafts in the airspace, congestion or interference on the communications channel being utilized, and/or human fallibilities (e.g., inexperience, hearing difficulties, memory lapse, language barriers, distractions, fatigue, etc.). Standard phraseology exists to limit the opportunity for misunderstanding and enable quick and effective communications despite language differences. However, there are circumstances where plain language communications become necessary, which may result in use of ambiguous or non-standard phraseology that may pose safety risks. For example, an incomplete and/or incorrect clearance communication could be acknowledged or acted on by a pilot, or a pilot of one aircraft may attempt to adhere to a clearance intended for another aircraft (e.g., as a result of call sign confusion). Accordingly, it is desirable to provide aircraft systems and methods that facilitate adherence to ATC clearances or commands with improved accuracy. Other desirable features and characteristics of the methods and systems will become apparent from the subsequent detailed description and the appended claims, taken in conjunction with the accompanying drawings and the preceding background.

BRIEF SUMMARY

Methods and systems are provided for assisting operation of a vehicle, such as an aircraft, using speech recognition and transcription. One method involves identifying an operational objective for an audio communication with respect to the vehicle, determining an expected clearance communication for the vehicle based at least in part on the operational objective, identifying a discrepancy between a transcription of the audio communication and the expected clearance communication, augmenting the transcription of the audio communication using a current operational context to reduce the discrepancy, resulting in an augmented transcription of the audio communication, and providing a graphical indication influenced by the augmented transcription of the audio communication.

In another embodiment, a computer-readable medium having computer-executable instructions stored thereon is provided. The computer-executable instructions, when executed by a processing system, cause the processing system to identify an operational objective for an audio communication with respect to a vehicle, determine an expected clearance communication for the vehicle based at least in part on the operational objective, identify a discrepancy between a transcription of the audio communication and the expected clearance communication, augment the transcription of the audio communication using a current operational context to reduce the discrepancy, resulting in an augmented transcription of the audio communication, and provide a graphical indication influenced by the augmented transcription of the audio communication.

In another embodiment, a system is provided that includes a communications system to receive an audio communication with respect to a vehicle, a data storage element to maintain information pertaining to a phraseology standard, and a processing system coupled to the communications system and the data storage element. The processing system is configurable to identify an operational objective for the audio communication, determine an expected clearance communication for the vehicle based at least in part on the operational objective using the information pertaining to the phraseology standard, identify a discrepancy between a transcription of the audio communication and the expected clearance communication, augment the transcription of the audio communication using a current operational context to reduce the discrepancy, resulting in an augmented transcription of the audio communication, and output an indication influenced by the augmented transcription of the audio communication.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
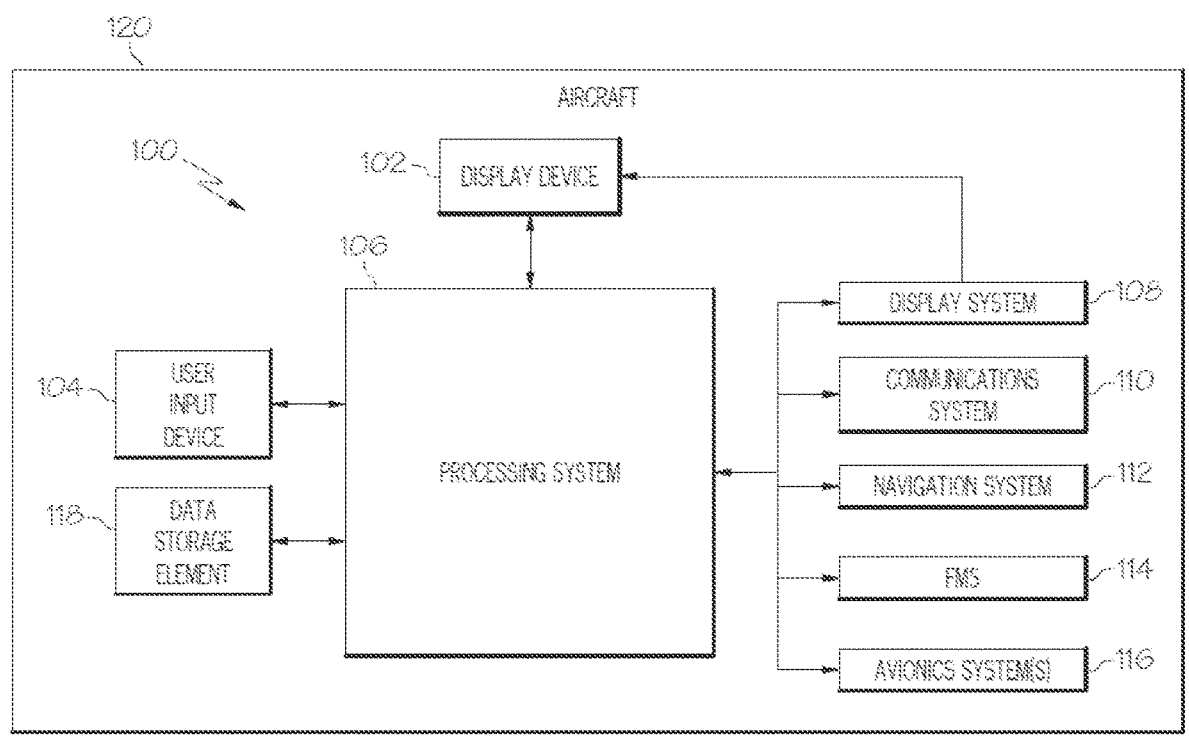
FIG. 1 is a block diagram illustrating a system suitable for use with a vehicle such as an aircraft in accordance with one or more exemplary embodiments.

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein generally relate to systems and methods for detecting and mitigating potential ambiguities or uncertainties in clearance communications associated with different vehicles operating within a commonly controlled area by augmenting transcriptions of clearance communications using the current operational context to reduce or otherwise mitigate discrepancies between the received clearance communications and the expected clearance communications. For purposes of explanation, the subject matter is primarily described herein in the context of aircraft operating in a controlled airspace; however, the subject matter described herein is not necessarily limited to aircraft or avionic environments, and in alternative embodiments, may be implemented in an equivalent manner for ground operations, marine operations, or otherwise in the context of other types of vehicles and travel spaces.

As described in greater detail below primarily in the context of FIGS. 2-7, audio communications received at the aircraft are parsed and analyzed to automatically identify an operational objective for an audio communication with respect to the aircraft. For example, natural language processing or similar artificial intelligence (AI) techniques may be applied to the audio communications (or transcriptions thereof) to ascertain the intent of a respective audio communication and identify the operational subjects or entities to which the respective audio communication pertains, such as, a particular aircraft or flight identifier, a runway, a taxiway, a waypoint, a heading, an altitude, a flight level, a communications radio or another avionics system or setting, an aircraft action (e.g., landing, takeoff, pushback, hold, or the like) and/or the like. Based on the operational objective, an expected clearance communication for the aircraft is determined based on the applicable phraseology standards, such as the international standards of phraseology set forth in the International Civil Aviation Organization (ICAO) Annex 10 Volume II Chapter 5, ICAO Doc 4444 Chapter 12 and in ICAO Doc 9432—Manual of Radiotelephony or another applicable phraseology standard for the particular geographic region or airspace (e.g., modified ICAO standards for improved suitability with a particular locality). In this regard, the expected clearance communication reflects the standard phraseology to be used for an audio clearance communication intending or attempting to achieve the identified operational objective.

When a discrepancy between the expected clearance communication and a transcription of the received audio clearance communication exists, the transcription of the received audio clearance communication exists is automatically augmented using the current operational context to reduce or otherwise mitigate the discrepancy and better comport with the applicable phraseology standards utilized to derive the expected clearance communication. For example, transcription of the received audio clearance communication may be modified to include an operational subject or operational parameter that was otherwise absent from the received audio clearance communication to obtain an augmented transcription that matches the expected clearance communication, or the expression of the operational subject or operational parameter within the transcription of the received audio clearance communication may be modified to comport with the applicable standard phraseology. In one or more embodiments, one or more graphical indicia may be provided to notify or otherwise indicate, to the pilot or other aircraft operator, that a discrepancy was identified with respect to a clearance communication received from the ATC or a clearance communicated by the pilot or other aircraft concurrently operating within the airspace. Additionally, in exemplary embodiments, graphical indicia or representations of the augmented transcription of the audio clearance communication may be provided in lieu of the original, "as received" transcription of the audio clearance communication to mitigate any potential ambiguities, uncertainties or other misunderstandings that could arise due to noncompliance with applicable phraseology standards. In this regard, by dynamically augmenting transcribed clearance communications in real-time to reflect the current operating context and current conversational context, the likelihood of miscommunication, misunderstandings, or other issues arising out of casual, incomplete, or noncompliant communications can be reduced.

By way of example, past aviation incidents have involved ATC issuing informal clearance communications, such as "go to the right side," without specifying a runway, taxiway, or other operational subject, resulting in pilots misinterpreting the clearance communications and taxiing into the path of another aircraft. In accordance with the subject matter described herein, a received audio ATC clearance communication of "go to the right side" would be syntactically and semantically analyzed to identify an operational objective of the ATC clearance communication and determine an expected ATC clearance communication for that operational objective in accordance with the applicable phraseology standard(s). In this regard, a discrepancy is detected when the expected ATC clearance communication includes an operational subject associated with the command ("go to") and/or the modifier ("right") contained in the received audio ATC clearance communication, and a graphical indication of the discrepancy may be rendered or otherwise provided on a display device onboard the aircraft to notify the pilot or other aircraft operator that the received ATC clearance communication utilized non-standard phraseology or is otherwise noncompliant with the applicable phraseology standard(s).

Additionally, the current operational context of the aircraft may be utilized to augment the transcription of the received ATC clearance communication to reduce the discrepancy and attempt to correct the use of nonstandard phraseology. For example, the current location of the aircraft with respect to a taxi clearance, a flight plan, or other defined route or manner of operation of the aircraft may be utilized to identify the expected operational subject for the received ATC clearance communication (e.g., the next taxiway of the taxi clearance, the runway specified by the taxi clearance or the flight plan, the assigned gate for the aircraft, and/or the like) before augmenting the transcription of the received ATC clearance communication to include the expected operational subject in a manner that is syntactically and semantically consistent with applicable phraseology standard(s). In this regard, the current operational status associated with the taxiways, runways, gates and/or the like may be utilized to intelligently augment the transcription by excluding from consideration taxiways, runways, gates and/ or the like that are not operational or currently in use. Additionally, or alternatively, in some embodiments, the augmented content may be determined or otherwise derived from analysis of the current conversational context and/or preceding clearance communications, by querying a database or other data storage element for information relevant to the current operational context, or by predicting the content of the expected ATC clearance communication using the current operational context and/or other real-time data (e.g., data derived from current or recent flight traffic and/or the flight paths associated therewith). In one or more exemplary embodiments, after augmenting the transcribed ATC clearance communication, a graphical representation of the augmented transcription of the ATC clearance communication is rendered or otherwise provided on the display device onboard the aircraft to help mitigate the discrepancy in concert with providing a graphical indication of the existence of the discrepancy (e.g., by rendering augmented portions of the transcription using a visually distinguishable characteristic), thereby conveying the potential uncertainty associated with the displayed ATC clearance communication to the pilot or other aircraft operator.

As another example, the subject matter described herein may also be utilized to correct or otherwise augment clearance communications that are incomplete or otherwise include indirect reference to a particular operational subject, a particular operational parameter and/or the like. For example, natural language processing or similar artificial intelligence (AI) techniques for syntactical and semantical analysis may be performed on the transcribed textual content of the received audio ATC clearance communication to identify keywords or placeholder terms that refer to a particular operational subject or operational parameter that is relevant to the clearance communication (e.g., a waypoint, runway, taxiway, airway, aircraft or call sign, frequency, altitude, aircraft action, and/or the like). Based on a discrepancy relative to an expected ATC clearance communication for the operational objective that includes the full and complete definition of the particular operational subject(s) and/or operational parameter(s) in accordance with the applicable phraseology standard(s), the transcription of the received ATC clearance communication is augmented or otherwise modified to include the relevant names, identifiers, values, and/or the like for the operational subject(s) and/or operational parameter(s) identified within the received ATC clearance communication. For example, an incomplete ATC clearance communication that includes an indirect reference to the departure tower frequency (e.g., "Contact departure") may be analyzed to identify the operational objective as the ground controller initiating a handoff to the departure controller, and based on the applicable phraseology standard(s), an expected ATC clearance communication for initiating the handoff may be identified that includes a particular frequency channel value to which the pilot is expected to tune a communications radio to before contacting the departure tower.

Based on the discrepancy between the expected ATC clearance communication and the received ATC clearance communication being the absence of the current radio frequency channel value associated with the departure tower, the transcription of the received ATC clearance communication may be automatically augmented to include the current radio frequency channel value associated with the departure tower and thereby conform to the expected ATC clearance communication in a manner that is syntactically and semantically consistent with applicable phraseology standard(s). In a similar manner as described above, the radio frequency channel value for the augmented content may be determined or otherwise derived from analysis of the current conversational context and/or preceding clearance communications (e.g., by identifying a preceding ATC clearance communication that specifies the tower frequency) or by querying a database or other data storage element for information identifying the departure tower radio frequency channel for the airport where the aircraft is currently located. Thereafter, a graphical representation of the augmented transcription of the ATC clearance (e.g., "Contact departure 121.49") may be rendered or otherwise displayed on a display device onboard the aircraft with the augmented content (e.g., the radio frequency channel "121.49") being rendered using a visually distinguishable characteristic that indicates the augmented content was not part of the originally-received ATC clearance communication.

As yet another example, the subject matter described herein may also be utilized to detect and correct indirect call sign references within clearance communications, which may otherwise result in confusion among pilots of different aircraft and/or by the ATC. For example, after initial contact with ATC is established, the controller may initiate or otherwise indicate an abbreviated call sign, such as, for example, a prefix and the last three digits or letters of the aircraft's registration number, or some combination or amalgamation of the aircraft's type, manufacturer name, model name and/or registration number. To track call signs, a table or similar data structure may be created in a database or other data storage element that maintains, for each clearance communication, a call sign for the aircraft associated with the clearance communication, the aircraft model for the aircraft associated with the clearance communication (if available), and one or more tags which may be utilized to identify the next expected clearance for that aircraft (e.g., indicia of the potential operational objective(s) expected for that aircraft).

For a newly received clearance communication that does not include a call sign or only includes an incomplete or abbreviated call sign, the entries associated with preceding clearance communications are analyzed to identify whether the newly received clearance communication corresponds to the next expected clearance communication associated with a preceding clearance communication entry, for example, by identifying whether the more recent clearance communication is a response to a preceding request clearance communication, whether the more recent clearance communication is a readback, a call back, or other acknowledgment of a preceding clearance communication, whether the more recent clearance communication includes common values for the aircraft model, registration number, or other operational subjects or parameters within the clearance communication, and/or the like. In this regard, when a more recently received clearance communication corresponds to the next expected clearance communication for a preceding clearance communication entry having an established full call sign associated therewith, the transcription of the more recently received clearance communication is augmented or otherwise modified to include or otherwise incorporate the full call sign established for that aircraft in a manner that is syntactically and semantically consistent with applicable phraseology standard(s). The database entry associated with the more recently received clearance communication is also updated to maintain an association with the full call sign established for that aircraft. Thus, graphical representations of the transcribed clearance communication may include the full sign to reduce the likelihood of any call sign confusion.

FIG. 1 depicts an exemplary embodiment of a system 100 which may be utilized with a vehicle, such as an aircraft 120. In an exemplary embodiment, the system 100 includes, without limitation, a display device 102, one or more user input devices 104, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In this regard, the display device 102 is coupled to the display system 108 and the processing system 106, and the processing system 106 and the display system 108 are cooperatively configured to display, render, or otherwise convey one or more graphical representations or images associated with operation of the aircraft 120 on the display device 102. The user input device 104 is coupled to the processing system 106, and the user input device 104 and the processing system 106 are cooperatively configured to allow a user (e.g., a pilot, co-pilot, or crew member) to interact with the display device 102 and/or other elements of the system 100, as described in greater detail below. Depending on the embodiment, the user input device(s) 104 may be realized as a keypad, touchpad, keyboard, mouse, touch panel (or touchscreen), joystick, knob, line select key or another suitable device adapted to receive input from a user. In some exemplary embodiments, the user input device 104 includes or is realized as an audio input device, such as a microphone, audio transducer, audio sensor, or the like, that is adapted to allow a user to provide audio input to the system 100 in a "hands free" manner using speech recognition.

The processing system 106 generally represents the hardware, software, and/or firmware components configured to facilitate communications and/or interaction between the elements of the system 100 and perform additional tasks and/or functions to support operation of the system 100, as described in greater detail below. Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof. For example, in one or more embodiments, the processing system 106 includes or otherwise accesses a data storage element (or memory), which may be realized as any sort of non-transitory short or long term storage media capable of storing programming instructions for execution by the processing system 106. The code or other computer-executable programming instructions, when read and executed by the processing system 106, cause the processing system 106 to support or otherwise perform certain tasks, operations, functions, and/or processes described herein.

The display system 108 generally represents the hardware, software, and/or firmware components configured to control the display and/or rendering of one or more navigational maps and/or other displays pertaining to operation of the aircraft 120 and/or onboard systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying navigational maps and/or other content on the display device 102.

In the illustrated embodiment, the aircraft system 100 includes a data storage element 118, which contains aircraft procedure information (or instrument procedure information) for a plurality of airports and maintains association between the aircraft procedure information and the corresponding airports. Depending on the embodiment, the data storage element 118 may be physically realized using RAM memory, ROM memory, flash memory, registers, a hard disk, or another suitable data storage medium known in the art or any suitable combination thereof. As used herein, aircraft procedure information should be understood as a set of operating parameters, constraints, or instructions associated with a particular aircraft action (e.g., approach, departure, arrival, climbing, and the like) that may be undertaken by the aircraft 120 at or in the vicinity of a particular airport. An airport should be understood as referring to any sort of location suitable for landing (or arrival) and/or takeoff (or departure) of an aircraft, such as, for example, airports, runways, landing strips, and other suitable landing and/or departure locations, and an aircraft action should be understood as referring to an approach (or landing), an arrival, a departure (or takeoff), an ascent, taxiing, or another aircraft action having associated aircraft procedure information. An airport may have one or more predefined aircraft procedures associated therewith, wherein the aircraft procedure information for each aircraft procedure at each respective airport are maintained by the data storage element 118 in association with one another.

Depending on the embodiment, the aircraft procedure information may be provided by or otherwise obtained from a governmental or regulatory organization, such as, for example, the Federal Aviation Administration in the United States. In an exemplary embodiment, the aircraft procedure information comprises instrument procedure information, such as instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like. In exemplary embodiments, the data storage element 118 maintains associations between prescribed operating parameters, constraints, and the like and respective navigational reference points (e.g., way-points, positional fixes, radio ground stations (VORs, VOR-TACs, TACANs, and the like), distance measuring equipment, non-directional beacons, or the like) defining the aircraft procedure, such as, for example, altitude minima or maxima, minimum and/or maximum speed constraints, RTA constraints, and the like. In this regard, although the subject matter may be described in the context of a particular procedure for purpose of explanation, the subject matter is not intended to be limited to use with any particular type of aircraft procedure and may be implemented for other aircraft procedures in an equivalent manner.

Still referring to FIG. 1, in exemplary embodiments, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude or above ground level for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system and/or another suitable data link system.

In exemplary embodiments, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. Although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

It should be understood that FIG. 1 is a simplified representation of the system 100 for purposes of explanation and ease of description, and FIG. 1 is not intended to limit the application or scope of the subject matter described herein in any way. It should be appreciated that although FIG. 1 shows the display device 102, the user input device 104, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the system 100 (e.g., via a data link and/or communications system 110). Similarly, in some embodiments, the data storage element 118 may be located outside the aircraft 120 and communicatively coupled to the processing system 106 via a data link and/or communications system 110. Furthermore, practical embodiments of the system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the FMS 114. In other words, some embodiments may integrate the processing system 106 with the FMS 114. In yet other embodiments, various aspects of the subject matter described herein may be implemented by or at an electronic flight bag (EFB) or similar electronic device that is communicatively coupled to the processing system 106 and/or the FMS 114.

Figure 2:
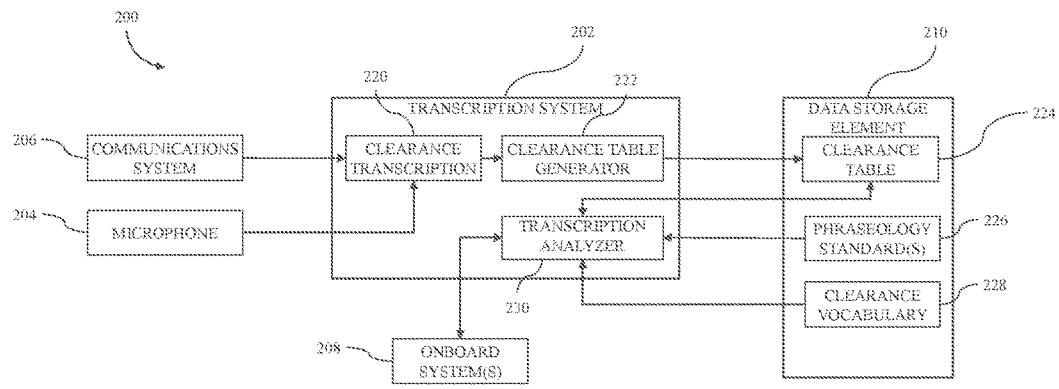
FIG. 2 is a block diagram illustrating a speech recognition system suitable for use with the aircraft system of FIG. 1 in accordance with one or more exemplary embodiments.

FIG. 2 depicts an exemplary embodiment of a speech recognition system 200 for transcribing speech, voice commands or any other received audio communications (e.g., broadcasts received from the automatic terminal information service (ATIS)). In one or more exemplary embodiments, the speech recognition system 200 is implemented or otherwise provided onboard a vehicle, such as aircraft 120; however, in alternative embodiments, the speech recognition system 200 may be implemented independent of any aircraft or vehicle, for example, at a ground location such as an air traffic control facility. That said, for purposes of explanation, the speech recognition system 200 may be primarily described herein in the context of an implementation onboard an aircraft. The illustrated speech recognition system 200 includes a transcription system 202, an audio input device 204 (or microphone) and one or more communications systems 206 (e.g., communications system 110). The transcription system 202 is also coupled to one or more onboard systems 208 (e.g., one or more avionics systems 108, 110, 112, 114, 116) to provide output signals or other indicia to a desired destination onboard system 208 (e.g., via an avionics bus or other communications medium). It should be understood that FIG. 2 is a simplified representation of the speech recognition system 200 for purposes of explanation and ease of description, and FIG. 2 is not intended to limit the application or scope of the subject matter described herein in any way.

The transcription system 202 generally represents the processing system or component of the speech recognition system 200 that is coupled to the microphone 204 and communications system(s) 206 to receive or otherwise obtain audio clearance communications and other audio communications, analyze the audio content of the clearance communications, and transcribe the audio content of the clearance communications, as described in greater detail below. Depending on the embodiment, the transcription system 202 may be implemented as a separate standalone hardware component, while in other embodiments, the features and/or functionality of the transcription system 202 may be integrated with and/or implemented using another processing system (e.g., processing system 106). In this regard, the transcription system 202 may be implemented using any sort of hardware, firmware, circuitry and/or logic components or combination thereof. For example, depending on the embodiment, the transcription system 202 may be realized as a general purpose processor, a content addressable memory, a digital signal processor, an application specific integrated circuit, a field programmable gate array, any suitable programmable logic device, discrete gate or transistor logic, processing core, a combination of computing devices (e.g., a plurality of processing cores, a combination of a digital signal processor and a microprocessor, a plurality of microprocessors, one or more microprocessors in conjunction with a digital signal processor core, or any other such configuration), discrete hardware components, or any combination thereof, designed to perform the functions described herein.

The audio input device 204 generally represents any sort of microphone, audio transducer, audio sensor, or the like capable of receiving voice or speech input. In this regard, in one or more embodiments, the audio input device 204 is realized as a microphone (e.g., user input device 104) onboard the aircraft 120 to receive voice or speech annunciated by a pilot or other crewmember onboard the aircraft 120 inside the cockpit of the aircraft 120. The communications system(s) 206 (e.g., communications system 110) generally represent the avionics systems capable of receiving clearance communications from other external sources, such as, for example, other aircraft, an air traffic controller, or the like. Depending on the embodiment, the communications system(s) 206 could include one or more of a very high frequency (VHF) radio communications system, a controller-pilot data link communications (CPDLC) system, an aeronautical operational control (AOC) communications system, an aircraft communications addressing and reporting system (ACARS), and/or the like.

In exemplary embodiments, computer-executable programming instructions are executed by the processor, control module, or other hardware associated with the transcription system 202 and cause the transcription system 202 to generate, execute, or otherwise implement a clearance transcription application 220 capable of analyzing, parsing, or otherwise processing voice, speech, or other audio input received by the transcription system 202 to convert the received audio content into a corresponding textual representation. In this regard, the clearance transcription application 220 may implement or otherwise support a speech recognition engine (or voice recognition engine) or other speech-to-text system. Accordingly, the transcription system 202 may also include various filters, analog-to-digital converters (ADCs), or the like, and the transcription system 202 may include or otherwise access a data storage element 210 (or memory) that stores a speech recognition vocabulary for use by the clearance transcription application 220 in converting audio inputs into transcribed textual representations. In one or more embodiments, the clearance transcription application 220 may also mark, tag, or otherwise associate a transcribed textual representation of a clearance communication with an identifier or other indicia of the source of the clearance communication (e.g., the onboard microphone 204, a radio communications system 206, or the like).

In exemplary embodiments, the computer-executable programming instructions executed by the transcription system 202 also cause the transcription system 202 to generate, execute, or otherwise implement a clearance table generation application 222 (or clearance table generator) that receives the transcribed textual clearance communications from the clearance transcription application 220 or receives clearance communications in textual form directly from a communications system 206 (e.g., a CPDLC system). The clearance table generator 222 parses or otherwise analyzes the textual representation of the received clearance communications and generates corresponding clearance communication entries in a table 224 in the memory 210. In this regard, the clearance table 224 maintains all of the clearance communications received by the transcription system 202 from either the onboard microphone 204 or an onboard communications system 206.

In exemplary embodiments, for each clearance communication received by the clearance table generator 222, the clearance table generator 222 parses or otherwise analyzes the textual content of the clearance communication using natural language processing and attempts to extract or otherwise identify, if present, one or more of an identifier contained within the clearance communication (e.g., a flight identifier, call sign, or the like), an operational subject of the clearance communication (e.g., a runway, a taxiway, a waypoint, a heading, an altitude, a flight level, or the like), an operational parameter value associated with the operational subject in the clearance communication (e.g., the runway identifier, taxiway identifier, waypoint identifier, heading angle, altitude value, or the like), and/or an action associated with the clearance communication (e.g., landing, takeoff, pushback, hold, or the like). The clearance table generator 222 also identifies the radio frequency or communications channel associated with the clearance communication and attempts to identify or otherwise determine the source of the clearance communication. The clearance table generator 222 then creates or otherwise generates an entry in the clearance table 224 that maintains an association between the textual content of the clearance communication and the identified fields associated with the clearance communication. Additionally, the clearance table generator 222 may analyze the new clearance communication entry relative to existing clearance communication entries in the clearance table 224 to identify or otherwise determine a conversational context to be assigned to the new clearance communication entry (e.g., whether a given communication corresponds to a request, a response, an acknowledgment, and/or the like).

Still referring to FIG. 2, in one or more embodiments, the processor, control module, or other hardware associated with the transcription system 202 executes computer-executable programming instructions that cause the transcription system 202 to generate, execute, or otherwise implement a transcription analysis application 230 (or transcription analyzer) capable of analyzing, parsing, or otherwise processing transcriptions of received audio communications along with their associated fields of data maintained in the clearance table 224 to detect or otherwise identify when a respective received audio communication does not comply with phraseology standards information 226 maintained in the data storage element 210. In this regard, the phraseology standards information 226 may include reference phraseologies, verbiage, syntactical rules and/or other syntactical information that define or otherwise delineate the applicable phraseology standard(s) for the aircraft at the current geographic location of the aircraft, which may be set forth by the ICAO, the FAA, or another regulatory body or organization. For example, the phraseology standards 226 may be maintained as a syntactic semantic mapping in a set of templates and/or rules that are saved or otherwise stored as a configuration file associated with the transcription analysis application 230. Additionally, the data storage element 210 may maintain a clearance vocabulary 228 that includes the potential words, alphanumeric values, terms and/or phrases that are likely to be utilized in the context of ATC clearance communications. As described in greater detail below in the context of FIG. 3, the transcription analyzer 230 utilizes the applicable phraseology standard(s) 226 in concert with the clearance vocabulary 228 to perform semantical and syntactical analysis, automatically identify discrepancies between a transcribed clearance communication and an expected clearance communication according to the phraseology standard(s) 226, and automatically augment the transcribed clearance communication to mitigate the potential discrepancies with respect to the expected clearance communication. As a result, the transcription analyzer 230 generates an augmented transcription of a received audio clearance communication that corrects for usage of nonstandard (or noncompliant) phraseology and/or indirect or incomplete information within the received audio clearance communication.

In various embodiments, the transcription analyzer 230 may automatically generate, transmit, or otherwise provide output signals indicative of a detected discrepancy to a display system 108, 208 or another onboard system 208 to notify the pilot or initiate other remedial action when a received audio clearance communication includes nonstandard phraseology or incomplete information. Additionally, when the pilot or other operator attempts to review the received audio clearance communication, the transcription analyzer 230 may output or otherwise provide the augmented transcription of a received audio clearance communication that includes augmented content that corrects for nonstandard phraseology and/or incomplete information to a display system 108, 208 or another onboard system 208 to provide a graphical representation of the augmented transcription including the augmented content in lieu of the transcription of the originally received audio clearance communication. In this manner, the augmented transcription generated by the transcription analyzer 230 reduces the likelihood of confusion or other miscommunication during operation of the aircraft.

Figure 3:
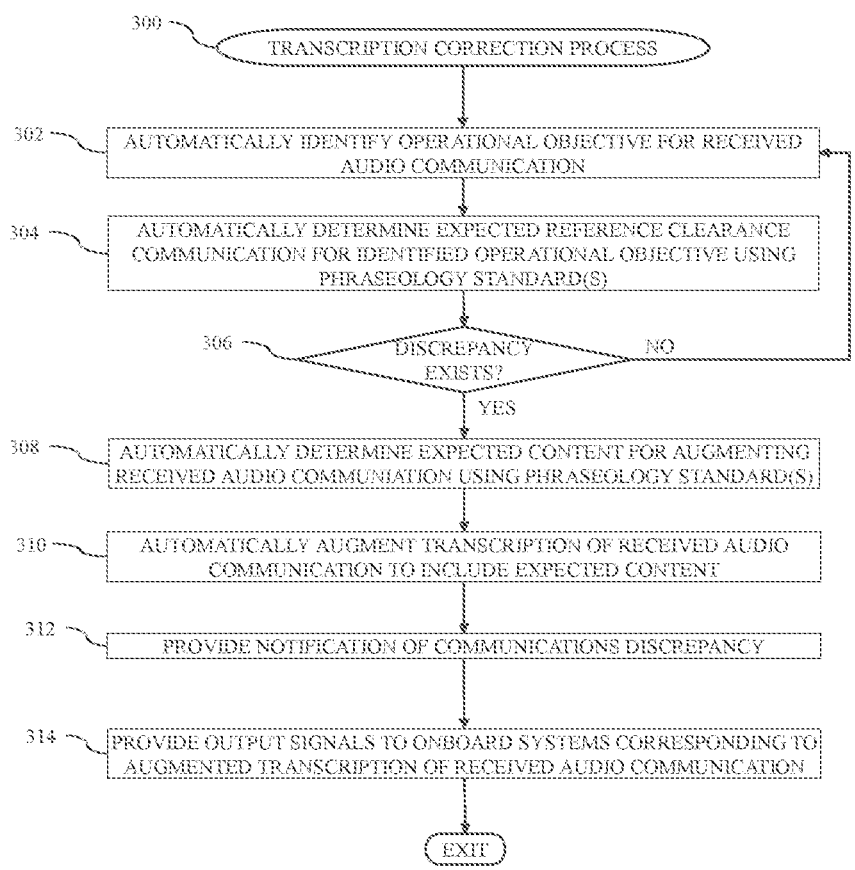
FIG. 3 is a flow diagram of a transcription augmentation process suitable for implementation by the speech recognition system of FIG. 2 in the aircraft system of FIG. 1 in one or more exemplary embodiments.

FIG. 3 depicts an exemplary embodiment of a transcription augmentation process 300 suitable for implementation by an aircraft system to augment or otherwise modify transcribed audio communications to comport with applicable phraseology standards. The various tasks performed in connection with the illustrated process may be implemented using hardware, firmware, software executed by processing circuitry, or any combination thereof. For illustrative purposes, the following description may refer to elements mentioned above in connection with FIGS. 1-2. In practice, portions of the transcription augmentation process 300 may be performed by different elements of the aircraft system 100. That said, exemplary embodiments are described herein in the context of the transcription augmentation process 300 being primarily performed by the transcription analyzer 230 at the transcription system 202 and/or the processing system 106. It should be appreciated that the transcription augmentation process 300 may include any number of additional or alternative tasks, the tasks need not be performed in the illustrated order and/or the tasks may be performed concurrently, and/or the transcription augmentation process 300 may be incorporated into a more comprehensive procedure or process having additional functionality not described in detail herein. Moreover, one or more of the tasks shown and described in the context of FIG. 3 could be omitted from a practical embodiment of the transcription augmentation process 300 as long as the intended overall functionality remains intact.

Referring to FIG. 3 with continued reference to FIGS. 1-2, in exemplary embodiments, the transcription augmentation process 300 continually monitors and analyzes received audio communications to automatically identify an operational objective for each received audio communication (task 302). As described above, in exemplary embodiments, the audio content of clearance communications received at the aircraft are continually transcribed into corresponding textual representations (e.g., by the clearance transcription application 220), which, in turn, are then parsed and analyzed to identify the operational subjects and parameters specified within the received sequence of clearance communications pertaining to the aircraft (e.g., by the clearance table generator 222). For example, natural language processing may be applied to the textual representations of the clearance communications directed to the ownship aircraft by ATC, provided by the ownship aircraft to ATC, or received from ATIS to identify the operational subject(s) of the clearance communications and any operational parameter value(s) and/or aircraft action(s) associated with the clearance communications, which are then stored or otherwise maintained in association with the transcribed audio content of the received audio communication in the clearance table 224. For each entry in the clearance table 224, the transcription analyzer 230 utilizes natural language processing, machine learning or artificial intelligence (AI) techniques to perform semantic analysis (e.g., parts of speech tagging, position tagging, and/or the like) on the transcribed audio communication to identify the operational objective of the communication. In other words, the audio communication is classified into a particular operational objective that indicates what the communication is intended to convey with respect to operation of the aircraft based on the syntax of the operational subject(s), operational parameter(s) and/or action(s) contained within the communication. For example, an ATC clearance communication of "CLEARED RUNWAY 27L" corresponding to an instruction to takeoff from a particular runway may be classified or otherwise categorized into a takeoff operational objective.

In some embodiments, the transcription analyzer 230 may utilize the current conversational context and/or transcriptions of preceding audio communications maintained in the clearance table 224 to intelligently determine the most likely operational objective in the context of the preceding communications to/from the aircraft. For example, if a preceding audio communication includes a request by the pilot of the ownship aircraft having a particular operational objective, the transcription analyzer 230 may ascertain a subsequent audio clearance communication received from ATC as a response pertaining to that same operational objective. Additionally, some embodiments of the transcription analyzer 230 may utilize the current operational context of the aircraft at the time of receipt of the respective audio communication (e.g., the current flight phase, the current airspace or geographic region of operation, the current aircraft configuration, the current aircraft altitude, and/or the like) to identify the most likely or probable operational objective given the current operating context indicated by the onboard systems 208.

After determining the operational objective for the received audio communication, the transcription augmentation process 300 automatically generates or otherwise determines an expected reference communication for the identified operational objective using the applicable phraseology standard(s) (task 304). In this regard, based on the identified operational objective, the transcription analyzer 230 utilizes phraseology standard information 226 to identify or otherwise determine the expected syntax for a clearance communication corresponding to the identified operational objective and the particular operational subject(s), operational parameter(s) and/or action(s) that are required or otherwise expected to be specified or declared within the clearance communication. For example, if the objective is takeoff instruction or command from ATC, the transcription analyzer 230 may determine the expected ATC clearance communication to include a runway identifier and the call sign for the intended recipient aircraft based on the standard phraseology (e.g., "CLEARED RUNWAY [RUNWAY IDENTIFIER] [AIRCRAFT TAIL NUMBER]").

After determining an expected reference clearance communication corresponding to the identified operational objective for the received audio communication using the applicable phraseology standard(s), the transcription augmentation process 300 compares the transcription of the received audio communication to the expected clearance communication to detect or otherwise identify whether one or more discrepancies exist (task 306). In this regard, the transcription analyzer 230 attempts to verify or otherwise confirm that the transcription of the received audio communication includes the required operational subject(s), operational parameter(s) and/or action(s) specified by the phraseology standard(s) for the identified operational objective with the required order or syntax. When the received audio communication matches the expected reference clearance communication or otherwise includes the required components associated with the expected reference clearance communication in the same order as the expected reference clearance communication, the transcription augmentation process 300 does not modify or augment the transcribed audio communication and exits or waits for the next subsequent audio communication to be received.

When the transcription augmentation process 300 identifies a discrepancy between the transcription of the received audio communication and the expected clearance communication, the transcription augmentation process 300 automatically identifies or otherwise determines the expected or probable content missing from the received audio communication to be utilized when augmenting the transcription of the received audio communication using the current operational context of the aircraft and then automatically augments or otherwise modifies the transcription of the received audio communication to include or otherwise incorporate the expected content and thereby reduce the discrepancy (tasks 308, 310). In this regard, the transcription augmentation process 300 attempts to complete or otherwise correct the transcription of the received audio communication to conform with the applicable phraseology standard(s). For example, when the transcription of the received audio communication fails to include or specify a value for a particular operational subject or parameter required by the phraseology standard(s), the transcription analyzer 230 utilizes the current operational context (e.g., the current flight phase, the current airspace or geographic region of operation, the current aircraft configuration, the current aircraft altitude, and/or the like) to identify the most probable or likely value for that operational subject or parameter based on the current operating state. Similarly, if the transcription of the received audio communication fails to include or specify a particular action for the aircraft, the transcription analyzer 230 may identify the most probable or likely action given the current operating state. In this regard, in addition to information indicative of the current operational context obtained from one or more onboard systems 208, the transcription analyzer 230 may also utilize the current and/or preceding conversational context using the clearance table 224 to determine the probable or expected content for the audio communication.

After identifying the probable or expected content for the received audio communication that is required to comport with the applicable phraseology standard(s), the transcription analyzer 230 may automatically update the transcription of the clearance communication in the entry in the clearance table 224 associated with the respective audio communication to an augmented transcription that includes or otherwise incorporates the probable or expected content with respect to the originally transcribed audio content using a syntax that comports with the applicable phraseology standard(s). Additionally, the transcription analyzer 230 may tag or otherwise mark the entry associated with the respective audio communication in the clearance table 224 to indicate or otherwise delineate the augmented portions of the transcription relative to the portions of originally transcribed audio content.

For example, continuing the above example, parts of speech tagging and analysis may be performed on the transcription of a received ATC clearance communication "CLEARED RUNWAY 27L" to attempt to match the ATC clearance communication to a reference clearance communication for a takeoff instruction ("CLEARED RUNWAY [RUNWAY IDENTIFIER] [AIRCRAFT TAIL NUMBER]"). In response to identifying the absence of a specified value for the aircraft identifier within the received ATC clearance communication, the transcription augmentation process 300 attempts to complete or otherwise correct the transcription of the received audio communication to include the aircraft identifier for the most likely intended recipient aircraft to conform with the applicable phraseology standard(s). For example, based on the preceding ATC clearance communications, the transcription augmentation process 300 may identify an aircraft on the ground that previously received a taxi clearance to the identified runway as the likely intended recipient of the takeoff instruction. Additionally, or alternatively, the transcription augmentation process 300 may analyze the various locations of aircraft on the ground at the airport to identify the likely intended recipient aircraft of the takeoff instruction based on the relative positions of the aircraft relative to the identified runway.

Still referring to FIG. 3, it should be appreciated there are numerous different ways in which the expected content for the received audio content may be identified or otherwise derived. For example, in some embodiments, the transcription analyzer 230 may query an airport database or other data storage element (e.g., data storage element 118) to obtain the appropriate identifiers or values to be utilized for a particular operational subject or parameter of interest given the current geographic location and operational state of the aircraft. For example, if the expected reference clearance communication according to the phraseology standard(s) is required to include a particular radio frequency communications channel associated with the current airport or airspace where the aircraft is currently operating, the transcription analyzer 230 may query an airport database to identify the appropriate radio frequency communications channel for the current airport or airspace and then augment the transcription of the received audio communication to include the obtained radio frequency communications channel value in a manner that is syntactically and semantically consistent with the phraseology standard(s).

As another example, the transcription analyzer 230 may analyze one or more preceding clearance communications in the clearance table 224 to identify a previously communicated identifier or value for a particular operational subject or parameter. For example, when the operational objective corresponds to an ATC assignment for a particular operational subject or parameter and the expected reference clearance communication is required to include an assigned value for that particular subject or parameter which is absent from the received audio communication, the transcription analyzer 230 may analyze one or more preceding clearance communications in the clearance table 224 to identify a preceding ATC assignment issued to another aircraft for that particular operational subject or parameter and utilize the value from that preceding ATC assignment to augment the more recently received audio communication of interest. Similarly, if the expected reference clearance communication includes the full call sign or identifier for the intended recipient aircraft and the transcription of the received audio communication only includes a partial, incomplete, or indirect identifier for the intended recipient aircraft, the transcription analyzer 230 may analyze one or more preceding clearance communications in the clearance table 224 to identify a previously communicated full call sign or identifier associated with that recipient aircraft and then augment or otherwise modify the transcription of the received audio communication to include the full call sign for the intended recipient aircraft in place of the partial, incomplete, or indirect identifier for the intended recipient aircraft. In this regard, some embodiments of the clearance table 224 may include additional columns or tables that are utilized to track or otherwise maintain call signs and other aircraft information (e.g., type, manufacturer, model, registration number and/or the like) associated with each respective clearance communication. Based on the preceding clearance communications with respect to a particular aircraft, the next expected clearance communication in the sequence of clearance communications with respect to that particular aircraft may be identified and utilized to correlate the received audio communication with that particular aircraft, and thereby identify or derive the full call sign for the intended recipient aircraft to be included in the received audio communication as the full call sign that was previously established for that particular aircraft.

As yet another example, the transcription analyzer 230 may utilize the current operational context to predict identifiers or values to be utilized for a particular operational subject or parameter of interest based on the current state of the aircraft and other data and/or information pertaining to the current environment, airspace or geographic region where the aircraft is operating. In this regard, when the expected reference clearance communication is missing a value defining a condition of performing a particular action according to the phraseology standard(s), transcription analyzer 230 may predict or otherwise determine the probable value for that condition. For example, if the received audio communication corresponds to an ATC clearance command to "Hold Short" without specifying a runway, duration, or other conditional subject or parameter value that defines the hold short condition, the transcription analyzer 230 may predict or otherwise determine the probable value(s) for augmenting the transcription of the ATC clearance command based on the current operational context. If the aircraft is currently taxiing on a taxiway that intersects a runway ahead of the aircraft's current location on the taxiway, the transcription analyzer 230 predict the ATC likely intended to specify the next runway the aircraft is likely to encounter and augment the transcription of the ATC clearance command to append the runway identifier for the probable runway to the hold short command (e.g., "Hold Short of R25").

Similarly, if ATC clearance command indicates a temporal conditional dependency (e.g., "Hold for," "Wait for," etc.), the transcription analyzer 230 may calculate or otherwise predict the values for that temporary conditional dependency based on data and/or information pertaining to the current or recent air traffic in the vicinity of the current geographic location and/or within the current airspace, such as, for example, automatic dependent surveillance—broadcast (ADS-B) data obtained via an onboard system 208. For example, based on one of more of the current geographic location of other nearby aircraft, the flight paths, taxi clearances, or the like associated with other aircraft in the vicinity of the ownship aircraft and/or the current conversational context and sequence of preceding clearance communications, the transcription analyzer 230 may identify or otherwise determine the other aircraft that was likely intended to be specified by the ATC and augment the transcription of the ATC clearance command to include the full call sign associated with the identified aircraft in connection with the conditional command (e.g., "Wait for Traffic BA1752"). Additionally, or alternatively, the transcription analyzer 230 may calculate or otherwise predict a duration for the conditional dependency based on the flight paths, taxi clearances, preceding clearance communications and/or the like and augment the transcription of the ATC clearance command to include the predicted duration (e.g., "Wait for 2 minutes").

Still referring to FIG. 3, in one or more embodiments, the transcription augmentation process 300 transmits, outputs, or otherwise provides one or more notifications of the detected discrepancy associated with the received audio communication (task 312). For example, the transcription system 202 and/or the transcription analyzer 230 may provide a command, signal or other instruction to a display system (e.g., display system 108) or another onboard system 208 that causes the destination onboard system 208 to provide one or more graphical indicia on a display device (e.g., display device 102) that includes text that notifies the pilot or other aircraft operator that the received audio communication did not comply with the applicable phraseology standard(s) or otherwise deviated from what was expected to be received. In some embodiments, the transcription system 202 and/or the transcription analyzer 230 may provide notification or indication of the discrepancy by rendering the augmented portion of the augmented transcription of the received audio communication using a visually distinguishable characteristic (e.g., a color, font weight, underlining, or the like) to provide a visual cue that a depicted audio communication transcription did not comply with the applicable phraseology standard(s) or otherwise deviated from the expected communication. Thus, a pilot may exercise increased caution and/or initiate one or more remedial actions with respect to the received audio communication (e.g., by requesting clarification or confirmation of the received audio communication).

In exemplary embodiments, the transcription augmentation process 300 also outputs, generates or otherwise provides commands or signals corresponding to the augmented transcription of the received audio communication to one or more onboard systems (task 314). In this regard, rather than utilizing the originally received audio communication that did not comply with the applicable phraseology standard(s) or otherwise deviated from the expected communication to alter, configure or otherwise influence operation of an onboard system 208, the transcription system 202 and/or the transcription analyzer 230 may provide a command, signal or other instruction that includes the augmented content to the onboard system 208 for implementation and/or execution. For example, the transcription system 202 and/or the transcription analyzer 230 may transmit or otherwise provide the augmented transcription of the received clearance communication to a display system 108, 208 to render or otherwise depict a graphical represented of the augmented transcription of the received audio clearance communication that includes the augmented content identified by transcription analyzer 230. In a similar manner, the transcription system 202 and/or the transcription analyzer 230 may transmit or otherwise provide commands, signals or instructions corresponding to the augmented transcription of the received clearance communication to another onboard system 208 to effectuate the augmented content identified by transcription analyzer 230 at that destination onboard system 208. For example, when the transcription of a received ATC clearance audio communication is augmented to include a radio frequency channel that was omitted from the originally received ATC clearance audio communication, the transcription system 202 and/or the transcription analyzer 230 may transmit or otherwise provide commands, signals or instructions indicative of the probable radio frequency channel identified by the transcription analyzer 230 to a communication system 110, 208 facilitate utilization of the augmented radio frequency channel at the communication system 110, 208. In a similar manner, when the transcription of a received ATC clearance audio communication is augmented to include values for particular operational subject or parameters that were omitted from the originally received ATC clearance audio communication, the transcription system 202 and/or the transcription analyzer 230 may transmit or otherwise provide commands, signals or instructions indicative of the augmented values identified by the transcription analyzer 230 to the FMS 114, 208 facilitate utilization of the augmented values at the FMS 114, 208 (e.g., to update a flight plan, a taxi clearance, and/or the like).

Figure 4:
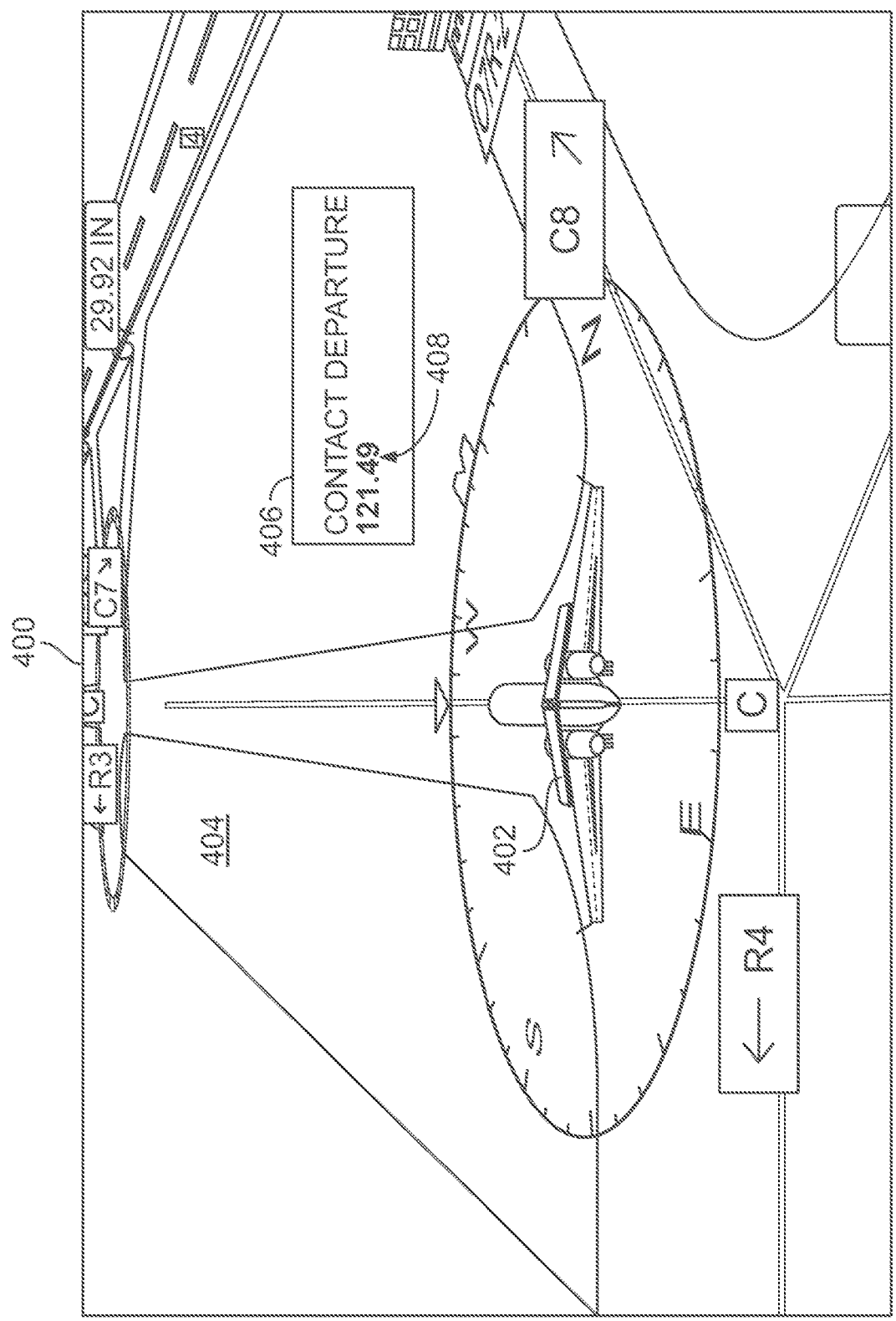
FIGS. 4-7 depict exemplary navigational map graphical user interface (GUI) displays suitable for presentation on a display device onboard the aircraft in the system of FIG. 1 in connection with the transcription augmentation process of FIG. 3 in accordance with one or more embodiments.

FIG. 4 depicts an exemplary navigational map graphical user interface (GUI) displays that may be displayed, rendered, or otherwise presented by a display system 108 and/or a processing system 106 on a display device 102 onboard an aircraft 120 in connection with the transcription augmentation process 300 of FIG. 3. FIG. 4 depicts a three-dimensional forward-looking perspective view navigational map GUI display 400 (e.g., a synthetic vision display, a primary flight display, or the like); however, it should be appreciated the subject matter described herein is not limited to any particular type or configuration of GUI displays and may be implemented in an equivalent manner in the context of two-dimensional lateral map displays, vertical profile displays or vertical situation displays, or any other sort of GUI display that may be presented in connection with operation of an aircraft or other vehicle.

The navigational map GUI display 400 includes a graphical representation 402 of the aircraft overlaid or rendered on top of a background 404, which generally includes a graphical representation of the terrain, topology, navigational reference points, airspace designations and/or restrictions, or other suitable items or points of interest corresponding to the currently displayed area of the map 400, which may be maintained in a terrain database, a navigational database, a geopolitical database, or another suitable database (e.g., database 118). In this regard, FIG. 4 depicts a scenario where the aircraft is located on the ground at an airport, where the display system 108 and/or processing system 106 renders a graphical representation of the runways, taxiways, terminal areas, gates, and/or other objects associated with the airport that are located within the currently displayed geographic area of the map 400. In one or more embodiments, the geographic location of the map 400 corresponding to the middle or center of the map 400 corresponds to the current geographic location of the aircraft to maintain the displayed area of the map 400 centered on the aircraft symbology 402. In this regard, the map 400 may be associated with the movement of the aircraft, and the aircraft symbology 402 and/or background 404 refreshes or otherwise updates as the aircraft travels, such that the graphical representation of the aircraft 402 is positioned over the terrain background 404 in a manner that accurately reflects the current (e.g., instantaneous or substantially real-time) real-world positioning of the aircraft relative to the Earth.

Referring to FIG. 4 with reference to FIGS. 2-3, in the illustrated embodiment, the navigational map display 400 includes a graphical representation 406 of an augmented transcription of the received audio of an original ATC clearance communication consisting of the words "Contact Departure" in connection with the transcription augmentation process 300. In this regard, as described above, based on the content of the received ATC clearance communication ("Contact Departure"), the transcription analyzer 230 and/or the transcription augmentation process 300 may automatically determine the operational objective associated with the ATC clearance communication was to initiate a handoff to the departure controller (task 302). Based on the operational objective to handoff the aircraft to another controller, the transcription analyzer 230 and/or the transcription augmentation process 300 utilizes the applicable phraseology standard(s) 226 and clearance vocabulary 228 to determine an expected reference ATC clearance communication that includes a specified radio frequency channel value for the destination controller that the aircraft is being handed off to (e.g., "Contact Departure [assigned frequency placeholder]") (task 304). Based on the absence of a specified value for the assigned frequency operational parameter within the originally received ATC clearance communication at the syntactical position of the assigned frequency operational parameter value placeholder within the expected reference ATC clearance communication, the transcription analyzer 230 and/or the transcription augmentation process 300 automatically detects or otherwise identifies a discrepancy associated with the received ATC clearance communication (e.g., task 306).

As described above, based on the current geographic location, the flight phase of the aircraft and/or other contextual operating information (e.g., on the ground in a taxiing flight phase at the start of the flight plan), the transcription analyzer 230 and/or the transcription augmentation process 300 automatically identifies the departure tower radio frequency channel value associated with the current airport and/or airspace, for example, by querying a database and/or analyzing preceding clearance communications including ATC commands for handoffs to the departure tower (task 308). The transcription analyzer 230 and/or the transcription augmentation process 300 automatically augments the transcription of the received ATC clearance communication to append the identified value for the assigned frequency operational parameter value placeholder of the expected ATC clearance communication to the originally transcribed content of the received ATC clearance communication (e.g., "Contact Departure 121.49") (task 310). Thereafter, when the pilot attempts to review the received ATC clearance communication on the display device 102, the transcription analyzer 230 and/or the transcription augmentation process 300 may provide the augmented transcription of the ATC clearance communication to the display system 108, 208, which, in turn renders the graphical representation 406 of the augmented transcription overlying the navigational map 400 (task 312). In this regard, the transcription analyzer 230 and/or the transcription augmentation process 300 may tag or otherwise indicate the augmented portion of the augmented transcription, such that the graphical representation of the augmented portion 408 (e.g., the radio frequency channel value 121.49) is rendered using one or more different visually distinguishable characteristics relative to the rendering of the remaining original portion of the transcription (task 310), thereby conveying to the pilot that the received ATC clearance communication did not comport with the applicable phraseology standard(s) or otherwise deviated from the syntax of the expected handoff instruction. For example, the augmented portion 408 may be rendered using yellow, red, or another color intended to convey a higher level of caution to the pilot while rendering the remaining portion of the graphical representation of the transcribed ATC clearance communication using a normal color (e.g., black).

Figure 5:
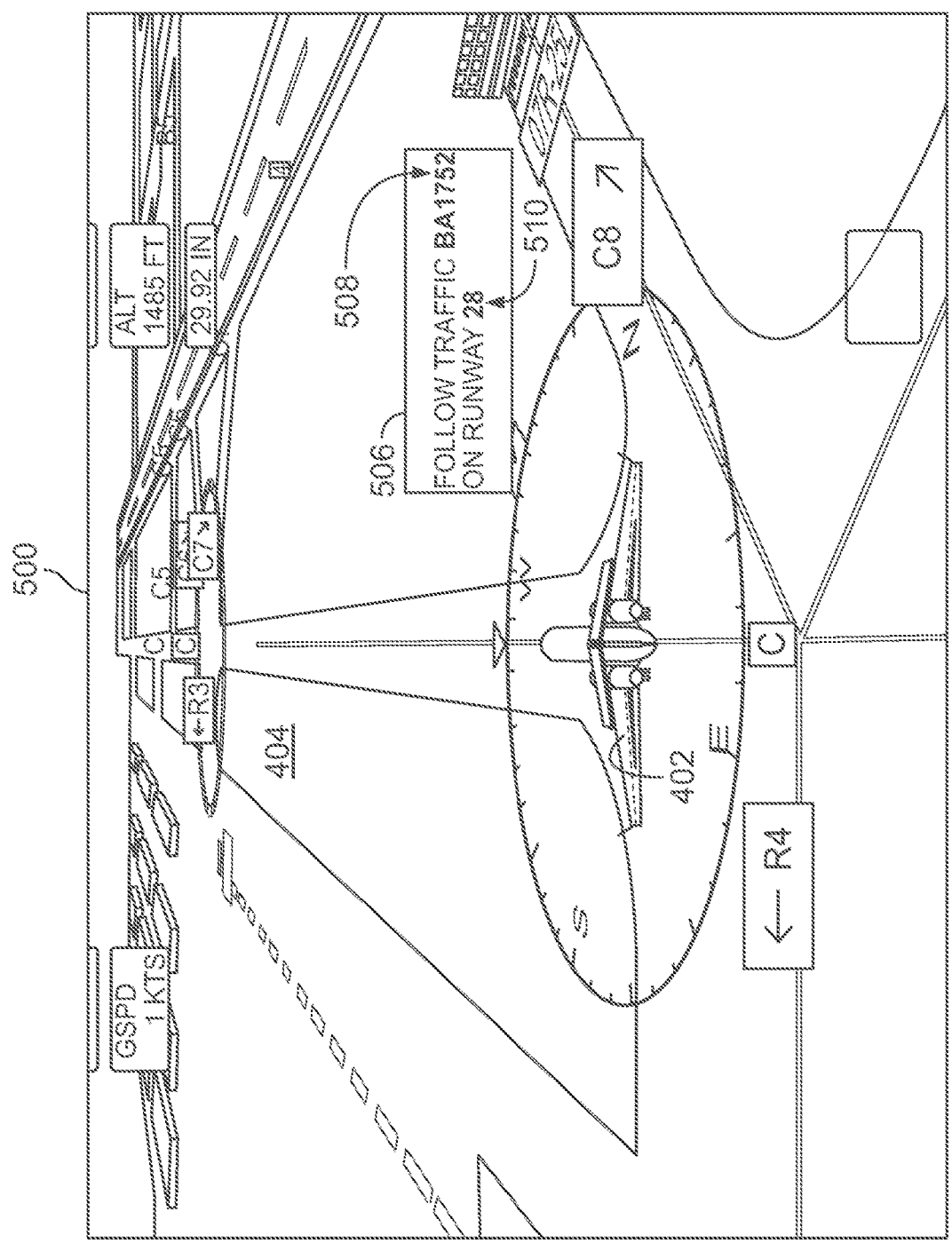

FIG. 5 depicts another exemplary embodiment of a navigational map GUI display 500 that may be displayed, rendered, or otherwise presented by a display system 108 and/or a processing system 106 on a display device 102 onboard an aircraft 120 in connection with the transcription augmentation process 300 of FIG. 3. Referring to FIG. 5 with reference to FIGS. 2-3, in the illustrated embodiment, the navigational map display 500 includes a graphical representation 506 of an augmented transcription of the received audio of an original ATC clearance communication consisting of the words "Follow Traffic on the Runway" in connection with the transcription augmentation process 300. In this regard, as described above, based on the content of the received ATC clearance communication, the transcription analyzer 230 and/or the transcription augmentation process 300 may automatically determine the operational objective associated with the ATC clearance communication was to follow a particular aircraft on a particular runway or taxiway. Based on the operational objective, the transcription analyzer 230 and/or the transcription augmentation process 300 utilizes the applicable phraseology standard(s) 226 and clearance vocabulary 228 to determine an expected reference ATC clearance communication that includes a call sign for the aircraft to be followed (e.g., "Follow Traffic [call sign]") and a valid runway or taxiway identifier. In this regard, based on the absence of a specified call sign for the traffic to be followed within the originally received ATC clearance communication, the transcription analyzer 230 and/or the transcription augmentation process 300 automatically detects or otherwise identifies a discrepancy associated with the received ATC clearance communication.

Based on the current location of the ownship aircraft and other aircraft in the vicinity of the aircraft, the transcription analyzer 230 and/or the transcription augmentation process 300 automatically identifies the probable or predicted aircraft to be followed by the ownship aircraft that is ahead of the ownship aircraft (e.g., by using the taxi clearance for the ownship aircraft) and then automatically augments the transcription of the received ATC clearance communication to append the full call sign for the identified aircraft value for the call sign placeholder of the expected ATC clearance communication to the originally transcribed content of the received ATC clearance communication (e.g., "Follow Traffic BA1752"). Additionally, based on the current location of the ownship aircraft and/or the probable aircraft, the current conversational context and/or preceding clearance communications, and/or other operational context information, the transcription analyzer 230 and/or the transcription augmentation process 300 automatically determines the runway identifier that was expected to be provided in the received ATC clearance communication (e.g., based on the runway the identified aircraft BA1752 is currently on or taxiing towards) and augments the transcription of the received ATC clearance communication to include the runway identifier in addition to the traffic call sign (e.g., "Follow Traffic BA1752 on Runway 28").

As described above, the transcription analyzer 230 and/or the transcription augmentation process 300 provides the augmented transcription of the ATC clearance communication to the display system 108, 208, which, in turn renders the graphical representation 506 of the augmented transcription overlying the navigational map 400, with the graphical representations of the augmented portions 508, 510 being rendered using one or more different visually distinguishable characteristics relative to the rendering of the remaining original portion of the transcription to convey that the identified aircraft and runway were not part of the originally received ATC clearance communication. Thus, a pilot may exercise increased caution and/or initiate one or more remedial actions with respect to the received audio communication (e.g., by requesting clarification or confirmation of the runway, etc.).

Figure 6:
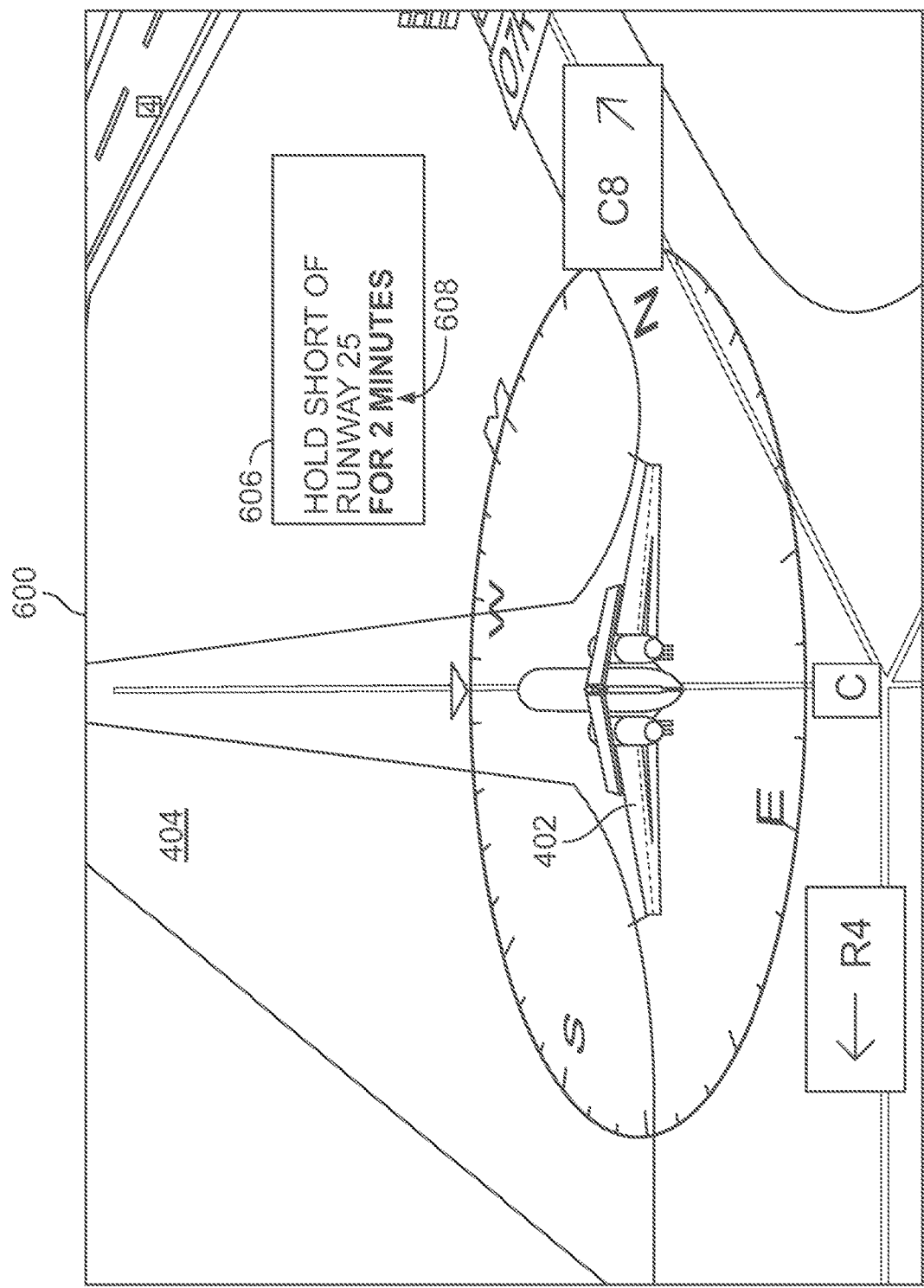

FIG. 6 depicts another exemplary embodiment of a navigational map GUI display 600 that may be displayed, rendered, or otherwise presented by a display system 108 and/or a processing system 106 on a display device 102 onboard an aircraft 120 in connection with the transcription augmentation process 300 of FIG. 3. Referring to FIG. 6 with reference to FIGS. 2-3, in the illustrated embodiment, the navigational map display 600 includes a graphical representation 606 of an augmented transcription of the received audio of an original ATC clearance communication consisting of the words "Hold Short of Runway 25" in connection with the transcription augmentation process 300. In this regard, FIG. 6 depicts a scenario where the expected reference ATC clearance communication according to the applicable phraseology standard(s) 226 includes a conditional duration for the hold short operational objective, where the transcription analyzer 230 and/or the transcription augmentation process 300 automatically calculates or otherwise determines a predicted duration for the hold short instruction based on the current operational context. For example, as described above, the transcription analyzer 230 may calculate or otherwise predict a value for the hold short duration based on one of more of the current geographic location of other nearby aircraft, the flight paths, taxi clearances, or the like associated with other aircraft in the vicinity of the ownship aircraft and/or the current conversational context and sequence of preceding clearance communications, and/or the like. Thereafter, the transcription analyzer 230 and/or the transcription augmentation process 300 automatically augments the transcription of the received ATC clearance communication to append the predicted hold short duration to the originally transcribed content of the received ATC clearance communication (e.g., "Hold Short of Runway 25 for 2 minutes"). The augmented transcription of the ATC clearance communication is provided to the display system 108, 208, which, in turn renders the graphical representation 606 of the augmented transcription overlying the navigational map 600, with the graphical representations of the augmented portion 608 being rendered using one or more different visually distinguishable characteristics relative to the rendering of the remaining original portion of the transcription.

Figure 7:
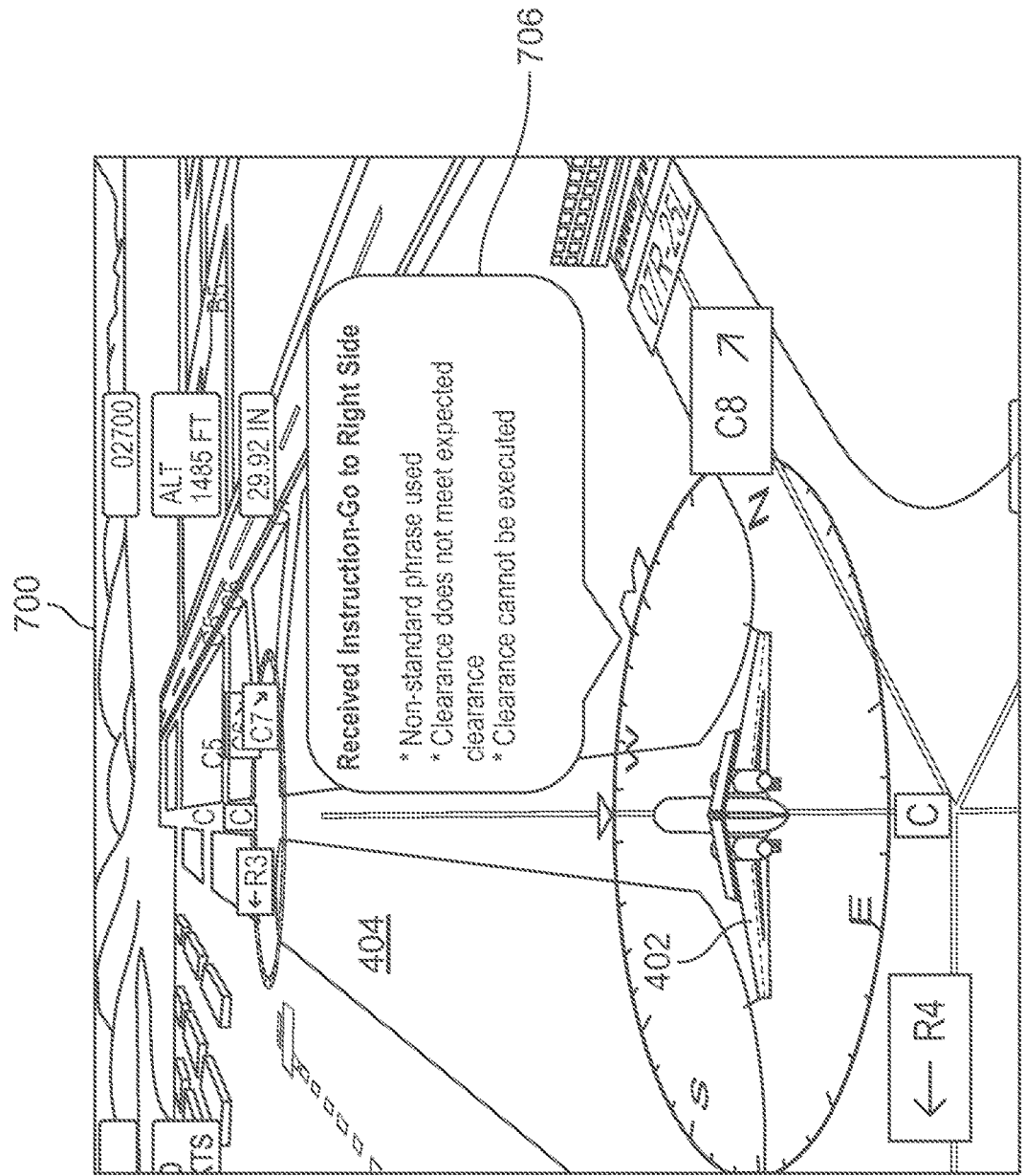

FIG. 7 depicts another exemplary embodiment of a navigational map GUI display 600 that may be displayed, rendered, or otherwise presented by a display system 108 and/or a processing system 106 on a display device 102 onboard an aircraft 120 in connection with the transcription augmentation process 300 of FIG. 3. In this regard, FIG. 7 depicts a scenario where the transcription analyzer 230 and/or the transcription augmentation process 300 is unable to identify or otherwise determine content for augmenting the received audio communication. Rather than presenting an augmented transcription of the received audio communication, the transcription analyzer 230 and/or the transcription augmentation process 300 presents or otherwise provides a notification 706 that the received audio communication did not comply with the applicable phraseology standard(s) 226 and/or deviates from the expected clearance communication in concert with providing a graphical representation of the transcription of the received audio communication. In this regard, the notification 706 may include explanatory information that explains or otherwise indicates the discrepancies associated with the received audio communication or how or why the current operational context was unable to be utilized to augment or resolve the discrepancies. In this manner, the pilot or other aircraft operator may be apprised of the potential issues associated with the received audio communication, thereby allowing the pilot to request clarification or confirmation of the received audio communication or otherwise initiate one or more remedial actions rather than acting on the received audio communication without awareness of the discrepancy.

For the sake of brevity, conventional techniques related to user interfaces, speech recognition, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting operation of an aircraft, the method comprising:
    analyzing a first transcription of a preceding audio communication to identify an air traffic control (ATC) assignment for an operational subject of the preceding audio communication with respect to the aircraft by performing semantic analysis of the first transcription of the preceding audio communication using natural language processing to identify an intent of the preceding audio communication;
    determining an expected clearance communication for the aircraft based at least in part on the ATC assignment, wherein the expected clearance communication includes an assigned value for the operational subject;
    identifying a second audio communication corresponding to the expected clearance communication for the aircraft; and
    when a discrepancy between a second transcription of the second audio communication and the expected clearance communication exists:
        determining an expected parameter value comprising a preceding ATC assignment issued to another aircraft for the operational subject of the second transcription of the second audio communication based at least in part on a transcribed textual representation of one or more preceding audio communications previously communicated for other aircraft maintained in a data storage element;

augmenting the second transcription of the second audio communication in real-time to include the expected parameter value for the operational subject, resulting in an augmented transcription of the second audio communication including the expected parameter value comprising the preceding ATC assignment for the operational subject; and providing a graphical representation of the augmented transcription of the second audio communication comprising the expected parameter value comprising the preceding ATC assignment for the operational subject and including a graphical indication of the discrepancy.

2. The method of claim 1, wherein determining the expected clearance communication comprises determining a reference clearance communication comprising standard phraseology for the ATC assignment based on one or more phraseology standards.

3. The method of claim 2, wherein:
the discrepancy comprises a difference between the second transcription of the second audio communication and the reference clearance communication; and
augmenting the second transcription of the second audio communication comprises modifying the second transcription to comport with the standard phraseology using a current operational context.

4. The method of claim 1, wherein determining the expected clearance communication comprises determining a next expected clearance for the aircraft based at least in part on one or more preceding clearance communications.

5. The method of claim 4, wherein:
the discrepancy comprises a difference between the second transcription of the second audio communication and the next expected clearance; and
augmenting the second transcription of the second audio communication comprises modifying the second transcription to match the next expected clearance using a current operational context.

6. The method of claim 1, wherein:
the expected clearance communication comprises a placeholder for the expected parameter value;
the discrepancy comprises an absence of the expected parameter value in the second transcription of the second audio communication; and
augmenting the second transcription of the second audio communication comprises modifying the second transcription to include the expected parameter value.

7. The method of claim 1, wherein:
the discrepancy comprises an indirect reference to the operational subject within the second transcription; and
augmenting the second transcription comprises augmenting the second transcription to include the expected parameter value in place of the indirect reference.

8. The method of claim 7, wherein:
the operational subject comprises at least one of a runway, a taxiway, a waypoint, a radio frequency channel and another aircraft.

9. The method of claim 1, wherein determining the expected parameter value comprises querying the data storage element using a current operational context to obtain the expected parameter value.

10. The method of claim 1, wherein:
determining the expected clearance communication comprises determining a reference syntax for a clearance communication associated with the intent of the preceding audio communication based on one or more phraseology standards; and identifying the discrepancy comprises comparing a syntax of the second transcription of the second audio communication to the reference syntax to identify a difference.

11. A non-transitory computer-readable medium having computer-executable instructions stored thereon that, when executed by a processing system, cause the processing system to:
analyze a first transcription of a preceding audio communication to identify an air traffic control (ATC) assignment for an operational subject of the preceding audio communication with respect to an aircraft by performing semantic analysis of the first transcription of the preceding audio communication using natural language processing to identify an intent of the preceding audio communication;
determine an expected clearance communication for the aircraft based at least in part on the ATC assignment, wherein the expected clearance communication includes an assigned value for the operational subject;
identify a second audio communication corresponding to the expected clearance communication for the aircraft; and
when a discrepancy between a second transcription of the second audio communication and the expected clearance communication exists:
determine an expected parameter value comprising a preceding ATC assignment issued to another aircraft for the operational subject of the second transcription of the second audio communication based at least in part on a transcribed textual representation of one or more preceding audio communications previously communicated for other aircraft maintained in a data storage element;
augment the second transcription of the second audio communication in real-time to include the expected parameter value for the operational subject, resulting in an augmented transcription of the second audio communication including the expected parameter value comprising the preceding ATC assignment for the operational subject; and
provide a graphical representation of the augmented transcription of the second audio communication comprising the expected parameter value comprising the preceding ATC assignment for the operational subject and including a graphical indication of the discrepancy.

12. The computer-readable medium of claim 11, wherein the computer-executable instructions cause the processing system to display the graphical representation of the augmented transcription of the second audio communication, wherein the graphical indication comprises a visually distinguishable characteristic associated with an augmented portion of the augmented transcription.

13. A system comprising:
a communications system to receive an audio communication with respect to an aircraft;
a data storage element to maintain information pertaining to a phraseology standard; and
a processing system coupled to the communications system and the data storage element to:
analyze a first transcription of a preceding audio communication to identify an air traffic control (ATC) assignment for an operational subject of the preceding audio communication with respect to the aircraft by performing semantic analysis of the first transcription of the preceding audio communication using natural language processing to identify an intent of the preceding audio communication;

determine an expected clearance communication for the aircraft based at least in part on the ATC assignment using the information pertaining to the phraseology standard, wherein the expected clearance communication includes an assigned value for the operational subject;

identify the audio communication corresponds to the expected clearance communication for the aircraft; and when a discrepancy between a second transcription of the audio communication and the expected clearance communication exists:

determine an expected parameter value comprising a preceding ATC assignment issued to another aircraft for the operational subject of the second transcription of the audio communication based at least in part on a transcribed textual representation of one or more preceding audio communications previously communicated for other aircraft;

augment the second transcription of the audio communication in real-time to include the expected parameter value for the operational subject, resulting in an augmented transcription of the audio communication including the expected parameter value comprising the preceding ATC assignment for the operational subject; and provide a graphical representation of the augmented transcription of the audio communication comprising the expected parameter value comprising the preceding ATC assignment for the operational subject and including a graphical indication of the discrepancy.

14. The method of claim 1, wherein determining the expected parameter value comprises determining the expected parameter value based at least in part on a current location of the aircraft with respect to a defined route.

15. The method of claim 14, wherein the defined route comprises a taxi clearance or a flight plan.

16. The method of claim 1, wherein determining the expected parameter value comprises identifying the expected parameter value specified in the one or more preceding audio communications.

17. The method of claim 1, wherein identifying the second audio communication corresponds to the expected clearance communication for the aircraft comprises identifying the second audio communication is one of a response, a readback, a call back and an acknowledgement of the preceding audio communication.

18. The method of claim 1, wherein identifying the second audio communication corresponds to the expected clearance communication for the aircraft comprises identifying the second transcription of the second audio communication includes one or more common values for the operational subject within the preceding audio communication.

\* \* \* \* \*